Jan. 3, 1928.       1,654,875
O. H. HANSEN
CAN FILLING MACHINE
Filed Nov. 28, 1921      2 Sheets-Sheet 2
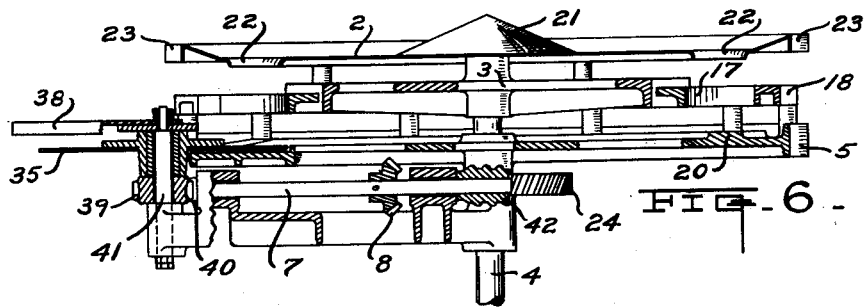
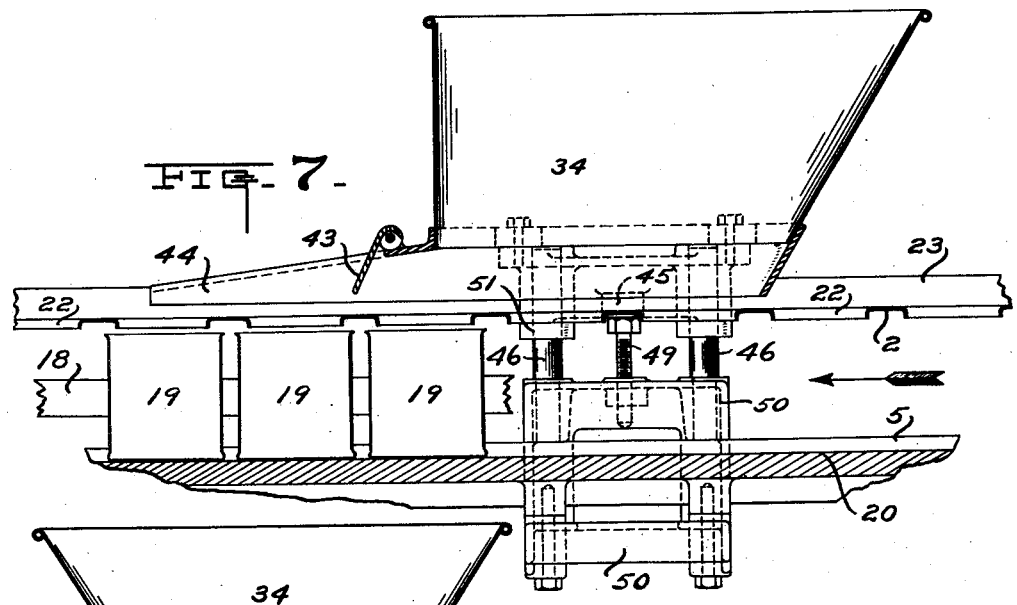
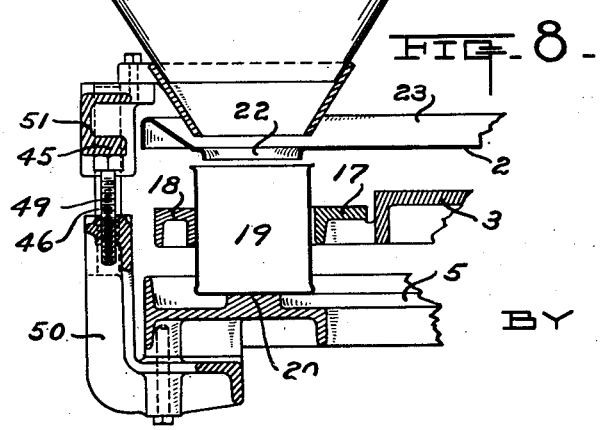
INVENTOR-
O. H. Hansen
BY
W. H. Lieber
ATTORNEY.

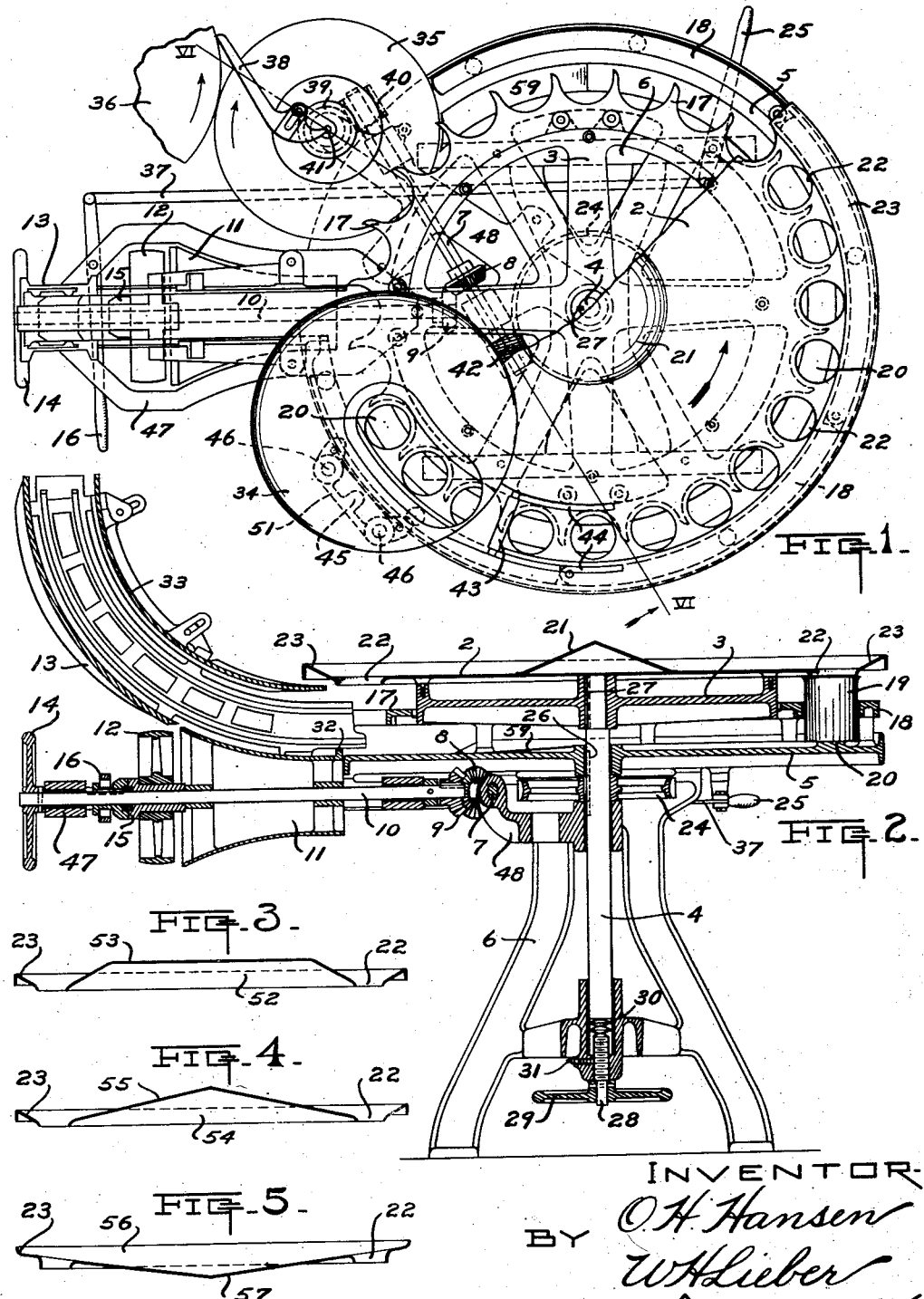

Patented Jan. 3, 1928.

1,654,875

UNITED STATES PATENT OFFICE.

OSWALD H. HANSEN, OF PORT WASHINGTON, WISCONSIN, ASSIGNOR TO HANSEN CANNING MACHINERY CORPORATION, A CORPORATION OF WISCONSIN.

CAN-FILLING MACHINE.

Application filed November 28, 1921. Serial No. 518,243.

This invention relates in general to improved mechanism for facilitating the placing of fruits, vegetables and other food products into containers, and relates more specifically to improvements in the construction and operation of semi-automatic can filling machines.

A general object of the invention is to provide a can filling machine which is simple in construction and efficient in operation.

The prior commercial mechanisms for packing fruits, vegetables and other food products in containers such as tin cans, may be segregated into two general classes. The first and perhaps the most extensive of these classes comprises machines which automatically measure and deliver quantities of material to the successive cans. The second class comprises machines which merely facilitate the packing operation, the material being actually placed into the successive containers by hand. The mechanism forming the subject of the present invention possesses characteristics of machines of both of these classes, since its operation is semi-automatic while it is especially adapted to operate with materials such as are ordinarily handled by machines of the second class.

A good example of a machine of the second class is disclosed in Letters Patent No. 1,200,377, granted October 3, 1916. In this patented machine the material is deposited in bulk into a central bowl having a peripheral or marginal rim provided with an annular series of perforations. When filling cans with the aid of this prior machine, the operators are stationed about the marginal rim and manually elevate small quantities or batches of material from the bowl and deposit them through the perforations into the cans located below. The capacity of prior machines of the second class, is necessarily limited and their operation is cumbersome, due to the fact that all of the material delivered to the successive advancing cans, must be manually elevated from a central bowl over a marginal rim. The structures of prior machines of the second class, are furthermore faulty in various respects, thus making these prior machines relatively inefficient in commercial operation.

The present invention has for its object the provision of mechanism whereby the necessity of manually elevating the material is entirely eliminated, and in which the necessity of handling the substance is reduced to a minimum. Some of the more important specific objects of the present invention are as follows:—To provide a semi-automatic can filling machine having maximum capacity for minimum attendance. To provide an exceedingly simple and compact machine operable by unskilled labor. To produce a sanitary hand pack filling machine all parts of which are readily accessible for cleaning and removal. To provide a mechanism the various parts of which are readily adjustable to accommodate different conditions of operation. To provide simple and efficient means for driving and for controlling a can filling machine of the hand pack type. To provide instrumentalities for preventing injury to cans as they are delivered to, through and from a filling machine. To provide a hand pack filler which may be manufactured at minimum cost and which is highly efficient in operation. To provide other improved features in construction and operation of can filling machines, which are readily applicable to existing machines of the non-automatic class.

A clear conception of several embodiments of the present invention and of the operation of devices constructed in accordance therewith, may be had by referring to the drawings accompanying and forming a part of this specification, in which like reference characters designate the same or similar parts in the several views.

Fig. 1 is a top view of a semi-automatic can filling machine having a part of its top plate broken away in order to permit clearer illustration of the sub-structure.

Fig. 2 is a central vertical section through the semi-automatic can filling machine.

Fig. 3 is a central vertical section through another form of top plate, drawn to a reduced scale.

Fig. 4 is a central vertical section through another form of top plate, drawn to a reduced scale.

Fig. 5 is a central vertical section through another form of top plate, drawn to a reduced scale.

Fig. 6 is a fragmentary vertical section through the semi-automatic can filling machine, the section being taken along the irregular line VI—VI of Fig. 1 looking in the direction of the arrow.

Fig. 7 is a fragmentary enlarged central vertical section through the material supply hopper, looking away from the axis of the can filling machine.

Fig. 8 is a fragmentary enlarged transverse vertical section through the material supply hopper.

The can filling machine comprises in general a top plate or member 2, a vertical main shaft 4 rotatably supporting the member 2, a stationary frame 5 located below the member 2, means for urging cans 19 through the vertical gap between the member 2 and the frame 5, means for conducting cans 19 to and from the frame 5, mechanism for drivingly connecting the movable machine elements, and means for feeding material upon the member 2.

The top plate or member 2 disclosed in Figs. 1 and 2, is preferably constructed of sheet metal with the aid of dies, and may be enameled to facilitate cleaning thereof. The member 2 is of circular shape and has a central material distributing cone 21 and an inclined peripheral portion 23. Directly adjacent to the lower edge of the inclined portion 23, the top member 2 is provided with an annular series of circular through openings 22 which are spaced equi-distant apart. The top member 2 is detachably secured to a rotary member 3 which is fastened to the upper extremity of the vertical main shaft 4 by means of a driving key 27. The vertical main shaft 4 is rotatably supported in bearings in the upper and lower stationary framing and rests upon a vertically adjustable thrust bearing 30. The thrust bearing 30 is vertically adjustable to vary the height of the gap between the top member 2 and the upper stationary frame 5, by means of a member 28 having screw thread coaction with the lower frame. The member 28 is rotatable for adjustment of the shaft 4 by means of a hand wheel 29, and may be locked in adjusted position by means of a locking set-screw 31. The upper and lower stationary framing is supported by side frames 6 of convenient height.

The upper stationary frame 5 is provided with a curved can track 20 which is located directly below the openings 22 in the top member 2, and the ends of which are inclined as indicated at 59 in order to raise and lower the entering and leaving cans 19 relatively to the openings 22. The frame 5 also supports a series of readily removable arc-shaped can guides 18 along which the cans 19 slide as they pass through the machine. The successive cans 19 are urged along the track 20 and guides 18 by means of detachable can hooks 17 secured to the rotary supporting member 3. The can guides 18 and the can hooks 17 may be readily removed and replaced by similar elements adapted to cooperate with cans 19 of various shapes and sizes.

The delivery of empty cans 19 to the machine is effected by means of a can guide 13 which is adapted to deposit the cans 19 in succession upon a revolving tapered feed drum 11. The walls 33 of the can guide 13, are adjustable to accommodate cans of various sizes and shapes. The revolving tapered feed drum 11 is carried by the horizontal operating shaft 10 which is supported in bearings in an auxiliary frame 47 secured to the top frame 5. The discharge end of the feed drum 11 is provided with a helical projection 32 which is adapted to engage the successive cans 19 and to gently whirl them into the path of the successive advancing can hooks 17.

The delivery of filled cans 19 from the machine is effected by means of rotary can discharge disks 35, 36 and an adjustable stationary guide 38. The disks 35, 36 have upper surfaces which lie in the upper horizontal plane of the upper stationary frame 5. The discharge disk 35 is rotatably mounted upon a stationary standard 41 supported in an auxiliary frame 48, and has a worm wheel 39 fastened to its hub.

The operation of the machine is effected either manually by means of a hand wheel 14 secured to the outer extremity of the horizontal operating shaft 10, or automatically by means of motive power applied to the drive pulley 12 associated with a medial portion of the shaft 10. When the hand wheel 14 is being employed to operate the machine, the pulley 12 is disconnected from the shaft 10 by manipulation of the jaw clutch 15. This clutch 15 may be manipulated either from the feed side of the machine by direct movement of the clutch operating lever 16, or from the discharge side of the machine by indirect movement of the lever 16 through a lever 25 and a cross connection 37. A bevel gear 9 secured to the inner extremity of the operating shaft 10 meshes with a bevel gear 8 secured to a medial portion of the horizontal intermediate shaft 7. The shaft 7 is supported in bearings in the auxiliary stationary frame 48, and has its outer extremity provided with a worm 40 which meshes with the driving worm wheel 39 of the can discharge disk 35. The inner extremity of the shaft 7 is provided with a worm 42 which meshes with a worm wheel 24 splined in a longitudinal recess or groove 26 in the vertical shaft 4. It will thus be noted that motion of the operating shaft 10 is simultaneously and positively transmitted to the various movable elements of the machine.

The material feeding means comprises a relatively large stationary feed hopper 34 located eccentrically relatively to the top member 2 and having a lower discharge opening which is elevated above the openings 22, see Figs. 1, 7 and 8. The hopper 34 is adjustably supported upon a vertically adjustable upper bracket 51. The bracket 51 is supported upon two parallel vertical posts 46 and has a lug 45 which rests upon the upper extremity of an adjusting bolt 49. The hopper 34 and the bracket 51 are freely vertically removable from the posts 46 and may be vertically adjusted relatively to the top member 2 by means of the adjusting bolt 49. The posts 46 and the adjusting bolt 49 are supported by a lower bracket 50 which is detachably secured to the stationary upper frame 5. The lower portion of the hopper 34 is provided with walls or extensions 44 which guide the material in the general direction of advancement of the openings 22. A horizontally pivoted flap 43 which is swingable laterally of the hopper 34 by the material passing beneath the flap, serves to check the free flow of material from the hopper 34 to the space between the extensions 44.

The top plate or member 52 illustrated in Fig. 3 is preferably formed with the aid of dies and has its entire central portion 53 elevated above the openings 22 thus producing an annular depression or groove adjacent to the openings 22. The top plate or member 54 illustrated in Fig. 4 is likewise preferably formed with the aid of dies and has a conical central elevated material distributing portion 55, the base of which extends in close proximity to the annular series of openings 22 thus producing an annular recess above the openings 22. The top plate or member 56 illustrated in Fig. 5 is also preferably formed with the aid of dies and has an inverted conical central portion 57 the base of which extends in close proximity to the annular series of openings 22. The top members 2, 52, 54 illustrated in Figs. 2, 3 and 4 all have the openings 22 formed in the lowermost portions thereof, thereby tending to automatically conduct the material toward the discharge openings 22. It should be noted that any of the top members 52, 54, 56 may be readily utilized in the filling machine disclosed in Figs. 1 and 2, without modification in the construction of the rotary supporting member 3.

Before describing the operation of the can filling machine, it may be stated that it is desirable to have the materials which are ordinarily packed with this type of machine, in plastic or semi-fluid condition with but slight quantities of free liquid present. If large quantities of free liquid are present, it is impossible to secure uniform pack in the successive cans 19 as some of the cans are bound to contain practically all solids while others will contain an excess of liquid. This defect of operation is especially apparent in machines of the prior art wherein the material is elevated into the cans from a central bowl having no provision for drainage of free liquid. In these machines, the operators naturally withdraw the solids from the bowl first, leaving the free liquid for delivery to subsequent cans 19. In order to avoid such undesirable packing, it is preferable to drain off excess free liquid from the material. Such removal of excess liquid may be readily effected in the present improved machine, by merely permitting the free liquid to flow into a receptacle placed below the hopper 34, leaving the solids to be deposited into the cans 19. In this way, a highly desirable and uniform pack is assured, regardless of the characteristics of the raw material.

During normal operation of the semi-automatic can filling machine, the various movable elements are simultaneously set in motion by applying power to the drive pulley 12 and throwing in the clutch 15 by manipulation of either of the levers 16, 25. The empty cans 19 are delivered by gravity through the can chute or guide 13, and are deposited upon the rotating can feed drum 11. The helical projection 32 of the feed drum 11 automatically delivers the successive empty cans 19 into the notches between the successive revolving can hooks 17. As the cans 19 positioned with their upper open ends directly below and in close proximity to the openings 22 of the member 2, are urged along the track 20 and guides 18, material from the stationary feed hopper 34 drops through the openings 22 and partially fills the successive cans. Other material is carried from the hopper 34 past the flap 43 and between the guide walls 44, by the rotating top member 2, the flap 43 acting automatically to check or to prevent undesirable free flow of material from the hopper 34. The advancing material thus withdrawn from the hopper 34, is temporarily confined to the path of travel of the openings 22 by the stationary guide walls 44 and is thus given further opportunity to automatically fill the successive cans 19. As the cans 19 and some of the material resting upon the member 2, continue to advance beyond the ends of the guide walls 44, the cans 19 which have not been properly automatically filled, are filled manually by one or more individuals stationed about the periphery of the machine, these attendants utilizing the material carried forward by the member 2 and the excess material from overfilled cans 19 to properly fill the under-filled cans. Since the cans 19 have considerable distance to travel beyond the ends of the walls 44 and before being delivered from the machine, the attendants have ample time to insure proper filling of all of the cans 19 even when the machine is operating at maximum speed. The filled cans 19 are automatically delivered from the machine by being placed in succession upon the rotating horizontal discharge disk 35. The disk 35 removes the cans from the stationary frame 5 and urges them against the stationary guide 38 which conducts the cans to the rotating final discharge disk 36. It will be apparent from the foregoing description, that the successive cans 19 are automatically conducted to, through and from the machine, and are more or less automatically filled during such transgression.

The manual labor required to insure proper filling of the successive cans 19 is materially reduced by placing the hopper 34 near the periphery of the top member 2 and above the discharge openings 22. The guide walls 44 further augment the automatic filling by temporarily confining the material discharged from the hopper 34, to the path of travel of the cans 19. The material carried beyond the ends of the walls 44 is also confined to the path of travel of the cans 19 by virtue of the location of the discharge openings 22 in the lowermost portion of the rotating member 2, thereby necessitating very little effort on the part of the attendants to insure proper filling of all the cans 19, and reducing to a minimum the necessary amount of human handling of the material.

The hopper 34 and the elements associated directly therewith, may be readily removed for cleaning purposes, by merely lifting it vertically from the posts 46. After the hopper 34 has been thus removed, the top member 2 may also be freely vertically removed to expose the lower elements of the machine for inspection. The sections of the can guide 18 are also freely vertically removable at all times, thus making the entire structure readily accessible for cleaning and removal.

If it is desired to fill cans of different sizes or shapes, such operation is readily accommodated by the various adjustments and by the removability of parts. The hopper 34 may be vertically adjusted by manipulation of the adjusting bolt 49. The top member 2 and the supporting member 3 may be vertically adjusted without interrupting the driving gearing, by release of the locking screw 31 and by subsequent manipulation of the hand wheel 29. The walls 33 of the can guide 13 may also be readily adjusted, and the can guides 18, can hooks 17 and the member 2 may be readily removed and replaced by corresponding elements adapted to cooperate with other types of cans 19.

The positive gear drives for the various movable elements also insure efficient operation of the machine and reduce the waste of material to a minimum by insuring location of the cans 19 directly below the openings 22. The arrangement of the shafting and gearing also reduces the mechanism to its simplest form and permits operation with minimum expenditure of power. The machine may be started or stopped from either the feed or the discharge side by manipulation of the levers 16, 25. Manual operation of the machine is readily accomplished by throwing out the clutch 15 and turning the hand wheel 14. Such operation is desirable for various reasons, as when removing a jammed can. The can guides 18 are also readily removable to facilitate removal of imperfect cans 19 which may become jammed at the ends of the can hooks 17.

It will also be noted that various elements of the improved machine, such as the hopper 34, top members 2, 52, 54, 56, can guides 18, can hooks 17, can feed drum 11 and others may be readily applied to existing machines of this type to improve their operation. The various elements of the machine are simple in construction while the assembled mechanism presents a neat appearance and requires minimum space for installation.

It should be understood that it is not desired to limit the present invention to the exact details of construction and of operation herein shown and described for various modifications within the scope of the claims may occur to persons skilled in the art.

It is claimed and desired to secure by Letters Patent:—

1. In a filling machine, a circular member having an annular series of openings therethrough, means for rotating said member, means for advancing cans directly beneath said member and with the open ends of the successive cans in direct communication with the successive openings of said series, a stationary hopper having a single lower delivery opening located closely adjacent to the top of said member and formed to simultaneously deliver material by gravity directly into a plurality of the successive cans through a plurality of the successive openings of said series, the distance between the lower end of said hopper and the top of said cans being less than the can height, and means for effecting relative adjustment of said hopper and member.

2. In a filling machine, a circular member having an elevated peripheral rim and an annular series of openings therethrough, means for rotating said member, means for advancing cans directly beneath said member and with the open ends of the successive cans in direct communication with the successive openings of said series, stationary hopper having a single lower delivery opening located below the top of said rim and formed to simultaneously deliver material by gravity directly into a plurality of the successive cans through a plurality of the successive openings of said series, said hopper discharge opening being elongated in the direction of advancement of said cans, and means for effecting relative adjustment of said hopper and member.

3. In a filling machine, a circular member having an annular series of openings therethrough, means for rotating said member, means for advancing cans directly beneath said member and with the open ends of the successive cans in direct communication with the successive openings of said series, a stationary hopper having a single lower delivery opening located closely adjacent to the top of said member and formed to simultaneously deliver material by gravity directly into a plurality of the successive cans through a plurality of the successive openings of said series, and means for effecting relative vertical adjustment of said hopper and said member to vary the distance between said delivery opening and said member.

4. In a filling machine, a member having an annular series of openings therethrough, means for rotating said member about the axis of annularity of said openings, means for advancing a series of cans with their upper open ends in direct communication with said member openings, a single stationary hopper formed to deliver material by gravity directly into each of the successive cans through successive openings of said series, and means for effecting vertical adjustment of said hopper to vary the distance between said hopper and said member.

5. In a filling machine, a circular member having an elevated peripheral rim and an annular series of openings therethrough, means for rotating said member, means for advancing cans directly beneath said member and with the open ends of the successive cans in direct communication with the successive openings of said series, a single stationary hopper having a lower delivery opening located below the top of said rim and formed to deliver material by gravity directly into each of the successive cans through the successive openings of said series, and means for effecting vertical adjustment of said hopper within said peripheral rim to vary the distance between said delivery opening and said member.

6. In a filling machine, a member having an annular series of openings therethrough, means for rotating said member about the axis of annularity of said openings, means for advancing a series of cans with their upper open ends in direct communication with said member openings, a hopper formed to deliver material directly into the successive cans through successive openings of said series, and means for effecting vertical adjustment of said hopper and of said member to vary the distance between said hopper and said member.

7. In a filling machine, a circular member having an annular series of openings therethrough, means for rotating said member, means for advancing cans directly beneath said member and with the open ends of the successive cans in direct communication with the successive openings of said series, a single stationary hopper having a lower delivery opening located closely adjacent to the top of said member and formed to deliver material by gravity directly into each of the successive cans through the successive openings of said series, and means for effecting independent vertical adjustment of said hopper and of said member.

8. In a filling machine, a sheet metal member having an elevated peripheral rim and a substantially plane portion integral with said rim and provided with an annular series of openings within and closely adjacent to said rim, means for rotating said member about an axis, means for advancing a series of cans with their upper open ends in direct communication with said member openings, a stationary hopper having a discharge opening below the top of said rim and adapted to deliver material by gravity directly through said openings into each of the successive cans, and means for varying the distance between said hopper and said member.

9. In a filling machine, a sheet metal member having an elevated peripheral rim and a substantially plane portion formed integral with said rim and provided with an annular series of openings within and closely adjacent to said rim, means for rotating said member about an axis, means for advancing a series of cans with their upper open ends in direct communication with said member openings, a stationary hopper having a discharge opening below the top of said rim and adapted to simultaneously deliver material by gravity directly through said openings and into a plurality of successive cans, and means for effecting vertical adjustment of said hopper and of said member to vary the distance between said hopper and said member.

10. In a filling machine, a circular member having an elevated peripheral rim and an annular series of openings therethrough, means for rotating said member, means for advancing cans directly beneath said member and with the open ends of the successive cans in direct communication with the successive openings of said series, a single stationary hopper having a lower delivery opening located below the top of said rim and formed to deliver material by gravity directly into each of the successive cans through the successive openings of said series, and means for effecting vertical adjustment of said member to vary the position of said rim relatively to said delivery opening.

11. In a filling machine, a member having an annular series of openings therethrough, means for rotating said member, means for advancing a series of cans with their upper open ends in direct communication with said member openings, a single stationary hopper formed to deliver material by gravity directly into each of the successive cans through successive openings of said series, and means for effecting independent vertical adjustment of said hopper and of said member to vary the distance between said hopper and said member.

12. In a filling machine, a member having an elevated peripheral rim and an annular series of openings within said rim, means for rotating said member about an axis, means for advancing cans in series with their upper open ends in direct communication with said member openings, a stationary hopper formed to simultaneously deliver material through said openings directly into a plurality of the successive cans and along said member in the direction of travel of said openings, and means for effecting vertical adjustment of said hopper and of said member to vary the distance between said hopper and said member.

13. In a filling machine, a member having an annular series of openings therethrough, means for rotating said member about an axis, means for advancing cans in series with their upper open ends in direct communication with said openings, a hopper having a single discharged opening formed to simultaneously deliver material directly into a plurality of the successive cans through successive openings of said series and along said member in the direction of travel of said openings, and means for guiding excess material delivered from said hopper along the path of travel of said openings.

14. In a filling machine, a member having an elevated peripheral rim and an annular series of openings adjacent to said rim, means for rotating said member about an axis, means for advancing cans with their upper open ends in direct communication with said openings, a hopper having a single discharge opening formed to simultaneously deliver material directly through a plurality of said openings into the successive cans and along said member in the direction of travel of said openings, and means for guiding excess material delivered from said hopper along the path of travel of said openings.

15. In a filling machine, a member having an annular series of openings therethrough, means for rotating said member about an axis, means for advancing cans with their upper open ends in direct communication with said member openings, a stationary hopper having a single discharge opening simultaneously exposing at least two complete member openings to said hopper and formed to deliver material directly into the successive cans through said openings and along said member in the direction of travel of said openings, means for guiding material delivered laterally from said hopper along the path of travel of said openings, and means for varying the distance between said hopper and said member.

16. In a filling machine, a rotary member having an annular series of openings therethrough, means for advancing cans below said openings, a hopper formed to deliver material directly into successive cans through successive openings of said series and laterally in the direction of travel of said openings, means for guiding material delivered laterally from said hopper, a pivoted flap between said guiding means and swingable laterally of said hopper for obstructing the lateral delivery of material from said hopper, and means for effecting vertical adjustment of said hopper to vary the distance between said flap and said member.

17. In a filling machine, a rotary member having an annular series of openings therethrough, a stationary hopper adapted to deliver material to said member in the direction of travel of said openings, means for effecting adjustment of said hopper relatively to said member, a flap pivoted to said hopper adjacent to the delivery opening thereof and swingable laterally of said hopper, and stationary guide walls for conducting material delivered past said flap along the path of travel of said openings.

18. In a filling machine, a rotary perforated member, a shaft supporting said member, a gear on said shaft, a stationary can support below said member, a stationary hopper above and formed to deliver material by gravity through the perforations in said member, means for adjusting said shaft longitudinally of its axis and relatively to said gear, and means for adjusting said hopper relatively to said member to vary the vertical distance between said member and said support and said hopper.

19. In a filling machine, a rotary member having an annular series of openings therethrough, means for advancing cans below said openings, a hopper formed to deliver material directly into successive cans through successive openings of said series and laterally in the direction of travel of said openings, means for guiding material delivered laterally from said hopper, a pivoted flap between said guiding means for obstructing the lateral delivery of material from said hopper, and means for effecting variation in the vertical distance between the pivot of said flap and said member by vertically adjusting said guiding means.

In testimony whereof, the signature of the inventor is affixed hereto.

OSWALD H. HANSEN.